(12) United States Patent
Moya

(10) Patent No.: US 11,427,490 B2
(45) Date of Patent: Aug. 30, 2022

(54) WATER PURIFICATION REPLICATING A KNOWN POPULAR SOURCE

(71) Applicant: Greencrown Water Systems, LLC, Belleville, NJ (US)

(72) Inventor: Emmanuel Moya, Burlington (CA)

(73) Assignee: GREEN CROWN WATER SYSTEMS, LLC, Little Falls, NJ (US)

( * ) Notice: Subject to any disclaimer, the term of this patent is extended or adjusted under 35 U.S.C. 154(b) by 773 days.

(21) Appl. No.: 15/802,805

(22) Filed: Nov. 3, 2017

(65) Prior Publication Data

US 2018/0179095 A1 Jun. 28, 2018

Related U.S. Application Data

(60) Provisional application No. 62/416,886, filed on Nov. 3, 2016.

(51) Int. Cl.
| | |
|---|---|
| C02F 9/00 | (2006.01) |
| C02F 101/20 | (2006.01) |
| C02F 1/42 | (2006.01) |
| C02F 1/66 | (2006.01) |
| C02F 1/28 | (2006.01) |
| C02F 1/78 | (2006.01) |
| C02F 1/68 | (2006.01) |

(Continued)

(52) U.S. Cl.
CPC ............ *C02F 9/00* (2013.01); *C02F 9/005* (2013.01); *C02F 1/001* (2013.01); *C02F 1/283* (2013.01); *C02F 1/42* (2013.01); *C02F 1/487* (2013.01); *C02F 1/66* (2013.01); *C02F 1/68* (2013.01); *C02F 1/78* (2013.01); *C02F 2001/422* (2013.01); *C02F 2001/425* (2013.01); *C02F 2101/203* (2013.01); *C02F 2101/30* (2013.01); *C02F 2209/005* (2013.01); *C02F 2303/02* (2013.01); *C02F 2303/04* (2013.01); *C02F 2303/16* (2013.01)

(58) Field of Classification Search
CPC .. C02F 1/001; C02F 1/283; C02F 1/42; C02F 1/487; C02F 1/66; C02F 1/68; C02F 1/78; C02F 9/00; C02F 9/005; C02F 2001/422; C02F 2001/425; C02F 2101/203; C02F 2101/30; C02F 2209/005; C02F 2303/02; C02F 2303/04; C02F 2303/16; A61K 2300/00; A61K 31/13; A61K 31/197; A61K 31/4453; A61K 31/48; A61K 31/505; A61K 31/517; A61K 31/12; A61K 31/155; A61K 31/352; A61K 31/4164; A61K 31/498; A61K 31/52; A61K 31/553; A61K 31/58; A61K 31/69; A61K 31/7076; A61K 45/06; A61K 51/0402; A61K 9/0048
USPC ...................................................... 210/96.1
See application file for complete search history.

(56) References Cited

U.S. PATENT DOCUMENTS

| | | | |
|---|---|---|---|
| 5,702,600 A * | 12/1997 | Pandolfo | C02F 1/485 |
| | | | 204/660 |
| 2002/0185423 A1* | 12/2002 | Boyd | A61L 2/183 |
| | | | 210/167.3 |
| 2011/0197662 A1* | 8/2011 | McAlister | A61L 2/183 |
| | | | 210/167.3 |

* cited by examiner

*Primary Examiner* — Akash K Varma
(74) *Attorney, Agent, or Firm* — Colin P. Abrahams

(57) ABSTRACT

A water replicating system comprises a water analyzer for analyzing a target water to determine relative content of selected components. The system further comprises a water treatment apparatus for receiving source water, the water treatment apparatus having a first treatment portion for removing or reducing the relative content of selected com- (Continued)

ELEVATION VIEW ponents and a second treatment portion for adding components so that the source water will substantially replicate the target water.

20 Claims, 5 Drawing Sheets

(51) Int. Cl.
*C02F 101/30* (2006.01)
*C02F 1/00* (2006.01)
*C02F 1/48* (2006.01)

ELEVATION VIEW

TOP VIEW

LEGEND:

1. FREQUENCY RESONATOR
2. SEDIMENT FILTER
3. ACTIVATED CARBON FILTER / KDF
4. OZONATOR
5. IONIZER TANK
6. VACUUM VENTURI INJECTOR
7. REGENERATIVE FORMULATED RESIN
8. FINAL PURIFIED / REPLICATED WATER DISCHARGE
8A. FLAVORED WATER DISCHARGE (OPTIONAL)
9. FLAVORED WATER MODULE

LEGEND:

1. FREQUENCY RESONATOR
2. SEDIMENT FILTER
3. ACTIVATED CARBON FILTER / KDF
4. IONIZER TANK
5. OZONATOR
6. INJECTOR (VACUUM VENTURI)
7. REGENERATIVE FORMULATED RESIN
8. 3-WAY SOLENOID ACTUATED VALVE
9. OPTIONAL FLAVORING (ADDED MINERALS)

1. WATER PURIFICATION & REPLICATION PROCESS
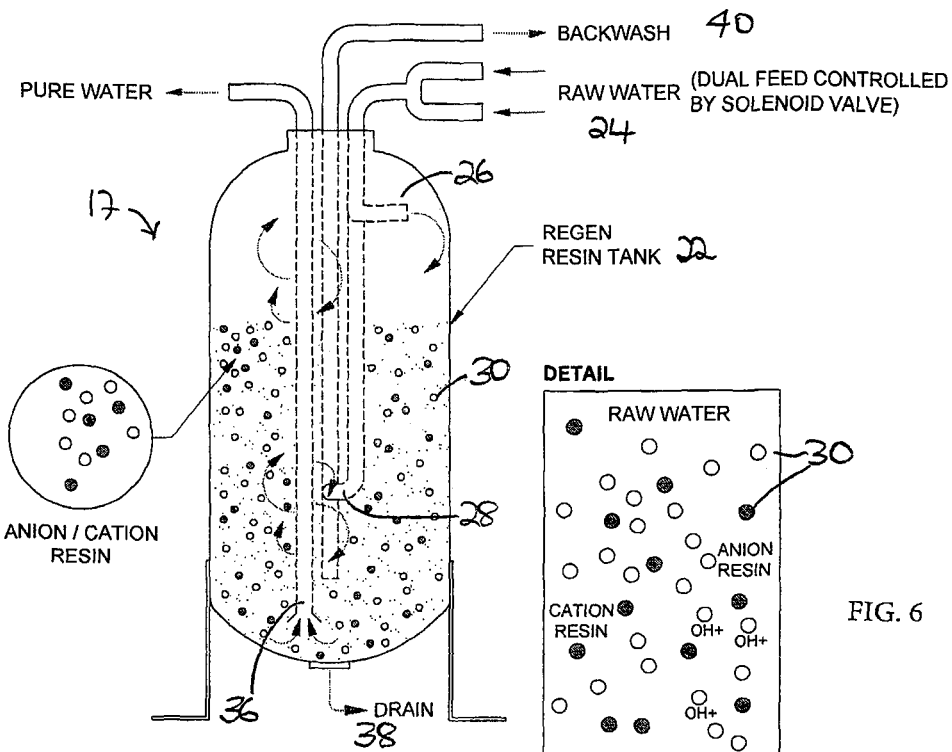
FIG. 4
FIG. 5
FIG. 6
EXPANSIVE METHOD OF RINSING AND BACKWASHING BY CENTRIFUGING METHOD OF WASHING
2. CAPTURE OF SODIUM CHLORIDES (BRINES + SEDIMENTS) AND CONVERSION TO SALTS FOR RE-USE
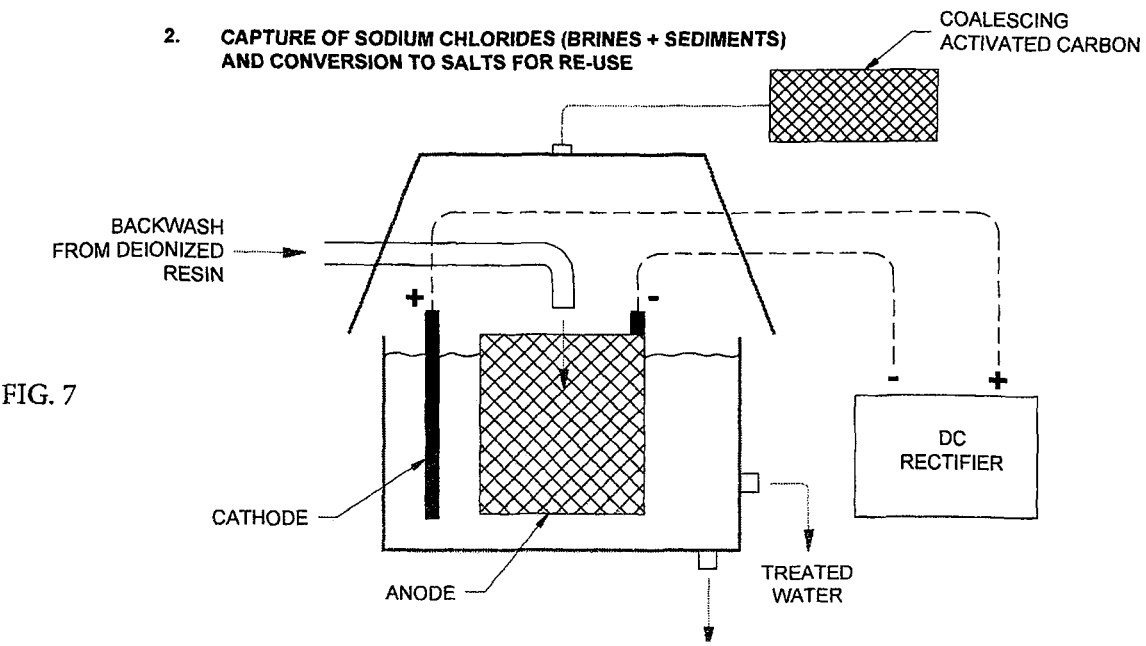
FIG. 7

LEGEND:

1. FREQUENCY RESONATOR
1A. 1ST INDUCTION COIL
1B. 2ND INDUCTION COIL
2. SEDIMENT / MIXED RESIN FILTER*
3. OXIDIZING GENERATOR
3A. INJECTOR SYSTEM
4. MIXED BED RESIN / AC*
4A. OPTIONAL REGEN TANK\
4B. RESIN TANK PROGRAMMABLE CONTROLLER
5. ACTIVATED CARBON FILTER

LEGEND:

1. INLET VALVE 3/4"Ø
2. 1ST INDUCTION COIL
3. SEDIMENT / RESIN FILTER (CITRIFIED)
4. OZONE INJECTOR
5. PROGRAMMABLE CONTROLLER
6. RESIN TANK
7. 2ND INDUCTION COIL
8. ACTIVATED CARBON FILTER
9. DISCHARGE VALVE
10. OUTLET MANIFOLD
11. FREQUENCY RESONATOR
12. OZONATOR
13. SURGE PROTECTED OUTLET
14. BOX CONTAINER 36 x 24 x 18

WATER PURIFICATION REPLICATING A KNOWN POPULAR SOURCE

CROSS-REFERENCE TO RELATED APPLICATIONS

This application claims the benefit of United States Provisional Patent Application No. 62/416,886 filed Nov. 3, 2016, the contents of which are incorporated herein by reference in their entirety.

FIELD AND BACKGROUND OF THE INVENTION

This invention relates to apparatus, systems and methods which are directed toward the replication and the regeneration of water processes. In one aspect, the invention aims to simplify the ability to create water which has specific properties, by removal or reduction of water components or ingredients which may not be required, and the addition of or treatment with other processes to provide the water characteristics which are required. In one aspect, the invention combines two technologies or processes into a single one. In this regard, the invention ascertains the properties of a desired first water type, and treats other second water types so as to emulate or replicate the properties and characteristics of the first water type.

SUMMARY OF THE INVENTION

According to one aspect of the invention, there is provided a water replicating system comprising: a water analyzer for analyzing a target water to determine relative content of selected components; and a water treatment apparatus for receiving source water, the water treatment apparatus comprising a first treatment portion for removing or reducing the relative content of selected components and a second treatment portion for adding components so that the source water will substantially replicate the target water.

According to a further aspect of the invention, there is provided a water purification and replicating apparatus for treating source water to have properties of a target water, the apparatus comprising: a frequency resonator for acting upon the source water; a sediment filter for receiving the source water which has been subjected to the frequency resonator; an activated carbon filter; an ozonator; an ionizer tank; a container for regenerative formulated resin; and a water discharge for discharging the source water which has been treated to replicate the properties of the target water.

In a further aspect, there is provided a method for replicating water comprising: analyzing a target water to determine relative content of selected components; and treating a source water by removing or reducing the relative content of selected components and adding components so that the source water will substantially replicate the target water.

The system in accordance with one aspect of the invention is a system and process providing the ability to mimic the water quality and characteristics of a well known source of water that has gained popularity, and apply such characteristics to water and water quality at another location. This may be accomplished by treating the water at such other locations by adding or reducing ingredients or components in a manner which will replicate the water from the desired source.

A water replication and purification system in accordance with the present invention is thus provided and designed to replicate a known source of water that may have been found to have benefits and advantages in, for example, the preparation of food ingredients and/or compounds that appeal to the taste buds of consumers. The invention is thus for a process where a known source of water, which is considered to have desirable properties and characteristics, is analyzed in the laboratory, identifying the good elements that must be replicated, removing and/or reducing the bad or less desirable elements, and improving the process by adding other infrastructures that will improve and sustain these improvements.

In one embodiment of the invention, the process may include, but is not necessarily limited to, the following steps and procedures:

(1) From the source of water, and after the meter, a frequency resonator is provided which adequately sizes using the reference pipe-flow characteristics. This item restructures the water molecule using complex electronic frequencies that precipitate calcium and magnesium carbonates, and other possible ingredients, which are natural ingredients likely to be found in water from almost any source. Precipitating these ingredients makes it easier for the water molecules to dissociate from other minerals. This method may also adjust water pH to a higher low alkaline level of about 7.85 to about 8.2.

(2) A sediment filter which may be stratified with citric acid from the peelings of, for example, oranges and/or lemons improves pH condition of water and removes precipitated minerals including rust and iron, silica, soil, and other inorganics.

(3) An activated carbon container or tank is provided which removes unwanted odor, color, turbidity (improves clarity of water), chemicals and pathogens/bacteria. Other components may also be removed in this step of the process.

(4) A regeneration resin tank or container with regenerative formulated resin is provided, (formulated to mimic desired water characteristics), and may be of the dual cationic and anionic type, where formulation could be effected by activation by means of steam or roasting (with flavored taste).

(5) Ionizers are provided, which may be able to balance, reduce and/or add ions, and exchange ions.

(6) Injection of ozone may be a further step in the process for oxidizing surrogate elements and disinfecting the final discharge of water. This injection of ozone may improve body hydration.

(7) Optional equipment may be added to the process for bottling purposes, and these may include the introduction of $CO_2$ similar to, for example, Perrier Water, or other substances which may enhance the taste or quality of the water for some, such as improving odor or providing selected flavors.

BRIEF DESCRIPTION OF THE DRAWINGS

The attached drawings illustrate various embodiments of the invention, although the invention is not specifically limited to the invention as shown in the drawings.

FIG. 4 is a schematic view of a water purification apparatus, more specifically a regenerative resin tank, which replicates a known popular source, in accordance with a further aspect of the invention;

FIG. 5 is a schematic cross or top view of the apparatus illustrated in FIG. 4 of the drawings;

FIG. 6 is a schematic detail view of molecules in a resin regeneration container showing gradient from a raw water to pure water arrangement;

FIG. 7 illustrates a system detail in accordance with one aspect of the invention, which is for capturing of sodium chlorides (comprising brines class sediments), and conversion thereof to salts for reuse;

DETAILED DESCRIPTION OF THE INVENTION

Figure 1:
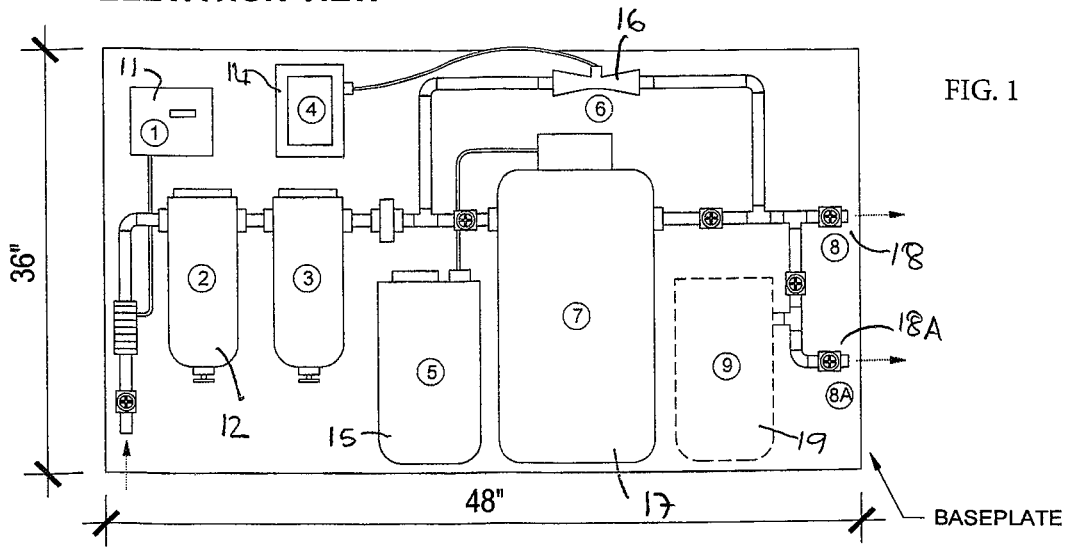
FIG. 1 is an elevation view of a water purification system which replicates a known popular source in accordance with one aspect of the invention.

One example of a specific market or context where the present invention may offer many advantages is a pizzeria where the dough, and specifically the yeast of the dough, reacts in cohesiveness with the water of New York City. In this example, the mass of the dough seems to increase in volume due to the ability of water to increase pH balance towards the lower alkalinity scale, causing minute breakdown of starches in the dough. When heated in an oven to a temperature of about 300-350 degree F., the oxygen in the mix may be converted during the baking process, and may react with the acid of the tomato sauce thereby giving it a flavored smell very distinct to the consumer as compared with other pizza restaurants from other areas or locations. Therefore, the taste, texture and other qualities may all, at least to some significant extent and potentially to a substantial extent, be a consequence or result of the water taste and properties used in the pizza preparation.

The water replication process may commence or be initiated by analyzing New York water, or any other selected and desirable source of water which is to be replicated. Some examples of targeted parameters of the water may include, but are not limited to, the following: pH, TDS (Total Dissolved Solids), conductivity, oxidation-reduction potential (ORP), temperature, alkalinity, calcium/magnesium hardness, copper, TKN, total nitrogen, total phosphorus, chlorine, and other parameters unique to New York water compared to others.

The results of the water analysis may be fed to a gas chromatographic analyzer to graph the chart, and provide a breakdown of the properties and characteristics of the water including relative amounts of different components and ingredients. Any minerals which are determined or considered to be unwanted or too abundant may be reduced to the minimum acceptable limit. They may not be totally removed, since smaller quantities of the particular ingredient may in fact add to the uniqueness of the water.

The system of the invention is configured so that it will preferably accept the rated flow with any source of water not necessarily from New York. The first step in the process of the invention is to restructure water molecules by introducing a complex electronic frequency using a frequency resonator preferably at about 10 to 14 kilohertz, to precipitate excess carbonates. The pH of water tends to adjust to a higher scale since acidic dissolved carbonates are precipitated and that water molecule has dissociated from these minerals during the molecular structuring of the water molecule. Then, precipitants with other sediments are collected by the citrified sediment filter at about 1+ micron. The combination of resonation and citrification by sediment filter results in the loosening of carbonates, and potentially other components, in the body of water.

The water then passes through an activated carbon or a KDF filter station, where various chemicals such as chlorine and other elements such as iron, lead, zinc, and alum, to mention certain examples only, may be removed.

The unique characteristics of the source water will undergo a complete replication at the regenerative formulated resin by steam heat fracturing or by controlled roasting by pyrolysis. A programmable controller could optionally be used to measure and compare results of the replicated water, and would send an alarm signal if the replicated water is not meeting the selected and desired requirements. Operator assistance or monitoring of the processes may be required from time to time for this purpose. An ion of sodium may be needed to be exchanged to the cation of the resin during ionizing process.

An optional module could be added to the system in order to add flavor or other properties to the replicated water. Such an optional module may comprise the addition of a soda mix, CO2, electrolytes and/or oxygen to this water as an added form of business benefit to the owner or user of the replicated water.

A residual service that may be required after designated frequencies, such as every year, is an extra technology, where any accumulated deionized resin is regenerated, and this may take place in or out of the client's or user=s premises. This aspect of the invention may be integrated to the original process for analyzing a known water source and replicating it, as a complementary technology or service to maintain the performance and quality of the system.

The objective of regenerating the resin is, of course, to prolong the life of the resin by restoring its properties which may have become compromised through repeated use, or even improve its quality from the manner in which it was initially processed or manufactured.

During the deionizing process in accordance with the invention, formulated resin binds minerals and other trace elements in the raw water. Anion resins attract salt while cation resin attract sulfates, phosphates, and chlorides. Both resins attract trace elements during the formulation and manufacturing processes, such as hydrocarbons and various heavy metals. After weeks, months or years of use, resins may become fouled and also produce odors and a bad taste when not properly rinsed and backwashed or otherwise maintained. When the resins are exhausted, most users may just abandon them. It is to be noted that the EPA (Environmental Protection Agency) regulates the use of salts during the water softening process.

In one aspect, the invention may provide processes and methods to reactivate and/or regenerate these resins. Residential, commercial or industrial systems may be at least partially restored and quality improved by the mere rinsing and back washing of the resin container and passing this water through an electro catanodic process similar to electrolysis. In this process, by altering thermal conductivity of water with known elements such as sodium chloride, direct current at a lower safe DC amperes travel throughout the water body allowing salts to bind to the electrode and become solids while the chlorides are converted to a gaseous form. The exhausted gas may then pass to a coalescing activated carbon filter neutralizing the air.

During the process of regeneration, the resin's and water's dwell and/or retention time, the temperature, as well as the stripping away of chemicals or hydrocarbons and other toxic elements, are preferably closely monitored. This non-chemical method of regenerating resins removes environmentally-regulated by-products including zinc, copper, nickel and hydrocarbons.

In a further embodiment of the invention, the collected salts with sediments that are considered inert could potentially be re-used by consumers in deicing driveways and steps.

Overall repeatable, accessible, and maintainable ("RAM") should be a top priority of the quality assurance for this system. A schematic drawing showing this process is in the disclosure of this application.

Figure 2:
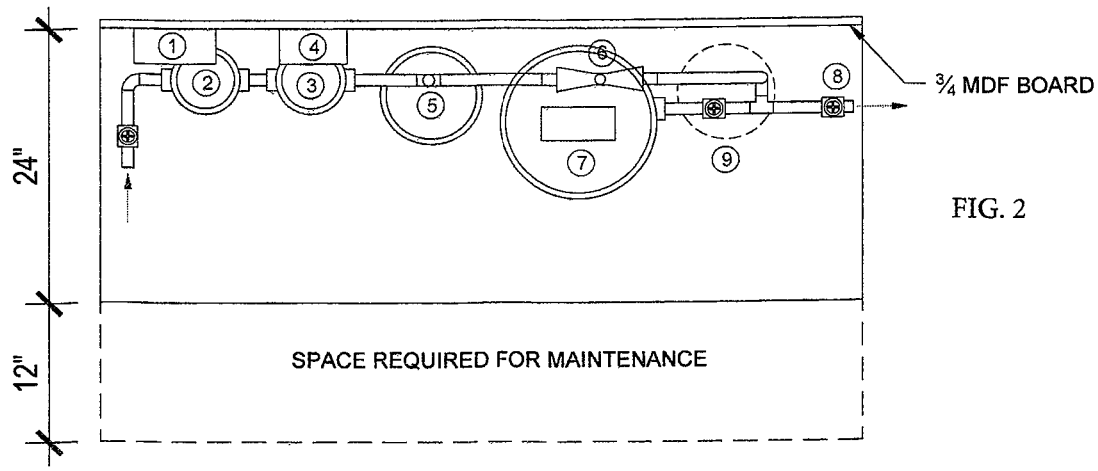
FIG. 2 is a top view of the system illustrated in FIG. 1 of the drawings.

With specific reference to FIGS. 1 and 2 of the drawings, there is shown an elevation view and a top view respectively of a system in accordance with one aspect of the invention. Water is introduced from a source, and exposed to the action of a frequency resonator 11. The water thereafter flows into a sediment filter container 12, which may be stratified with citric acid from orange and lemon peelings, and thereafter flows through a conduit into the regenerative formulated resin container 17. The water, at or prior to the resin container 17, may be treated by an ozonator 14, introduced through a vacuum Venturi injector 16, and an ionizer tank 15 is positioned to appropriately treat the water.

Within the regenerative formulated resin container 17, the water is subjected to certain processes as will be described shortly with respect to FIGS. 4 to 7 of the drawings. However, once purified within the formulated resin container 17, the water is discharged. As shown in FIGS. 1 and 2, the discharge may be as purified and replicated water 18. However, the water may be selectively directed the operation of valves to a flavored water discharge outlet 18A, and a flavored water module 19 is positioned so as to inject the desired flavor into the purified water. As mentioned above, a significant number of different types of flavorings and other treatments may be made to the purified water to produce a result which is preferred and desired by the end-user.

In FIG. 4 of the drawings, it will be seen that the regenerative formulation resin container 17 comprises a tank 22 with a dual feed inlet 24 for the raw water, the dual feed inlet preferably being controlled by a solenoid valve. The inlet discharges the raw water into the tank 22 and an upper outlet 26 in the upper portion of the tank 22 and a lower outlet 28 in the lower portion of the tank 22. The water passes through anion and cation resin particles 30, a detail of which is illustrated in FIG. 6, and as the raw water passes through such resin, it is treated and purified by the time it reaches the bottom portion of the tank 22. An outlet conduit 36 conveys the purified water from the lower portion of the tank 22 to the outside thereof. Note that the tank 22 includes a drain 38 at or near the base thereof.

FIG. 5 of the drawings shows a schematic top or section view through the tank 22, while FIG. 6 of the drawings, as mentioned, shows the detail of the anion and cation resins in the regenerative formulated resin container 17. FIG. 6 also shows the presence of the hydroxyl radical anion which is distributed in the resin. FIG. 4 further illustrates the presence of the backwash conduit 40 which may be used for maintaining and cleaning the resin.

FIG. 7 of the drawings illustrates schematically the capture of sodium chlorides, comprising brines plus sediments, and the conversion thereof to salts for reuse. The backwash from the deionized resin is introduced into the apparatus passes through the anode, and eventually exits as treated water. The cathode and the anode are electrical contact with the DC rectifier. Further, coalescing activated carbon may comprise a portion of the system.

Figure 3:
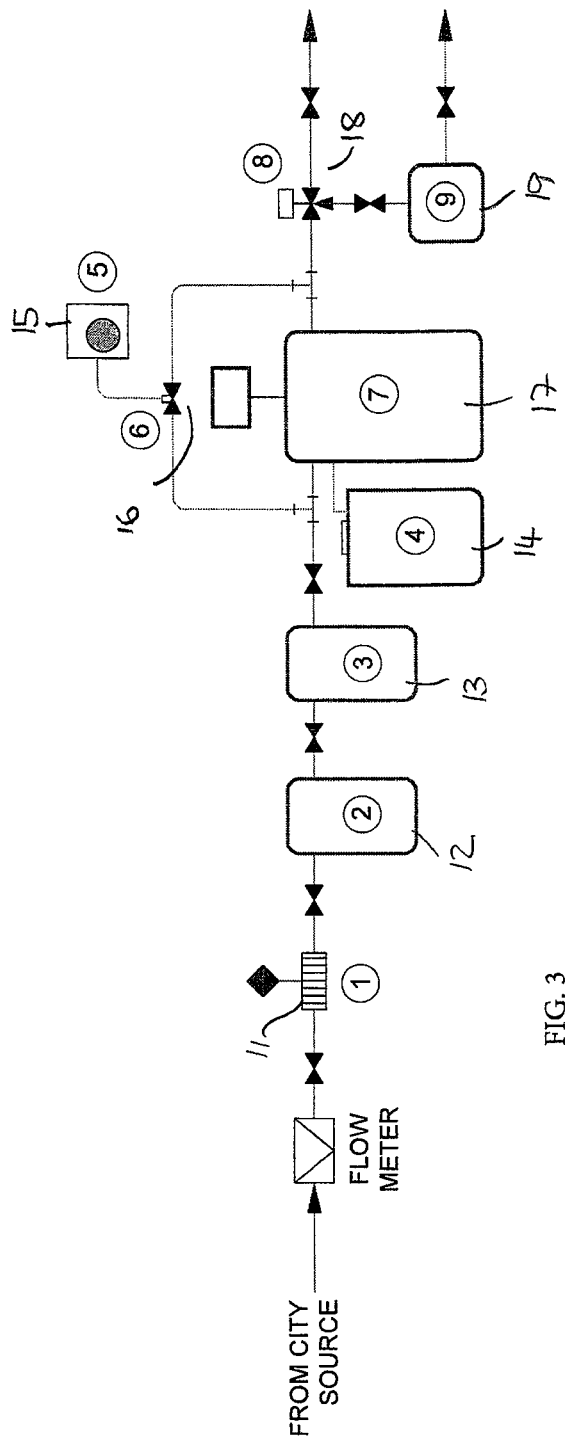
FIG. 3 is a schematic illustration showing the various sequences, structures and steps of a water purification system replicating a known popular source in accordance with an aspect of the invention.

FIG. 3 of the drawings shows a system similar to that shown in the prior drawings showing water flowing from a city source through a flowmeter. The water passes through the frequency resonator 11, to the sediment filter 12, to the activated carbon filter 13. The water then flows to the regenerative formulated resin container 17, and an ionizer tank 14, and an ozonator 15 are provided for the treatment of the water. And injector 16, of the vacuum Venturi type, is also provided. The discharge of the water is effected through a three-way solenoid actuated valve 18, whereby the water can be discharged through a first outlet as pure water, or, selectively, through a second outlet after being treated by an optional flavoring member 19, where flavoring or added minerals are incorporated into the water.

Figure 8:
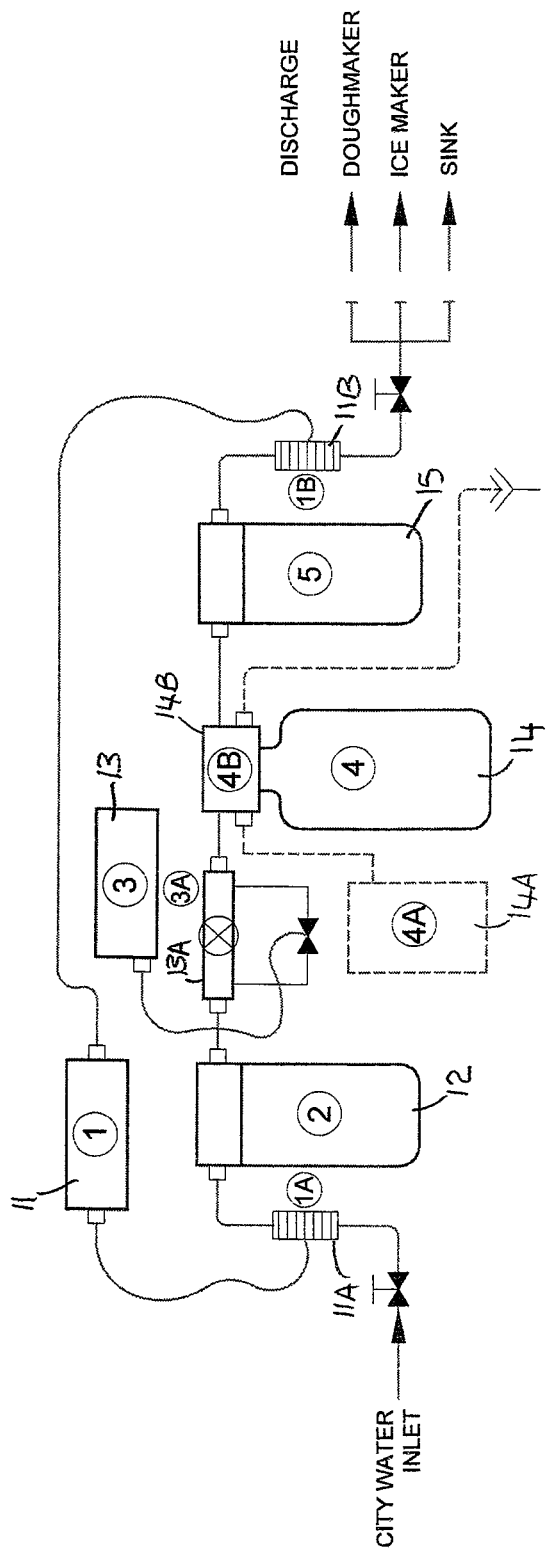
FIG. 8 illustrates a further embodiment of the water purification and replication system of the invention including induction coils.

FIG. 8 of the drawings shows a further embodiment in accordance with the present invention, whereby water from a city water inlet passes through a first induction coil 11A, where it is acted on by a frequency resonator 11. The water passes onto the sediment or mixed resin filter 12. An oxidizing generator 13 is provided utilizing the injector system 13A. The water then flows to the mixed resin bed 14, which may operate in association with an optional regenerative tank 14A. A programmable controller 14B is provided and associated with the mixed bed resin container of 14. Thereafter, the water passes to an activated carbon filter 15, and then through a second induction coil 11B, where it is also acted upon by the frequency resonator 11. The purified and regenerated water is discharged, and optional discharge outlets are provided to, for example, a dough maker, icemaker or sink, which are examples only of the variety of discharges which can be used.

Figure 10:
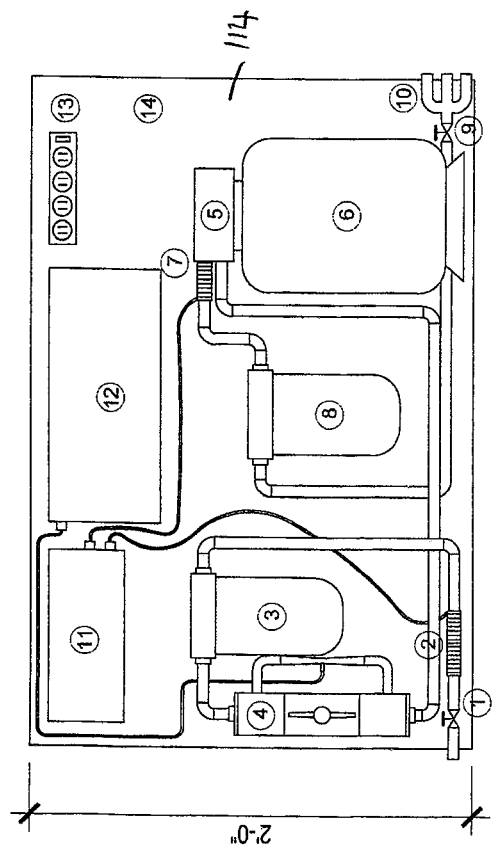
FIG. 10 is an elevation view of the system as illustrated in FIG. 9 of the drawings.
Figure 9:
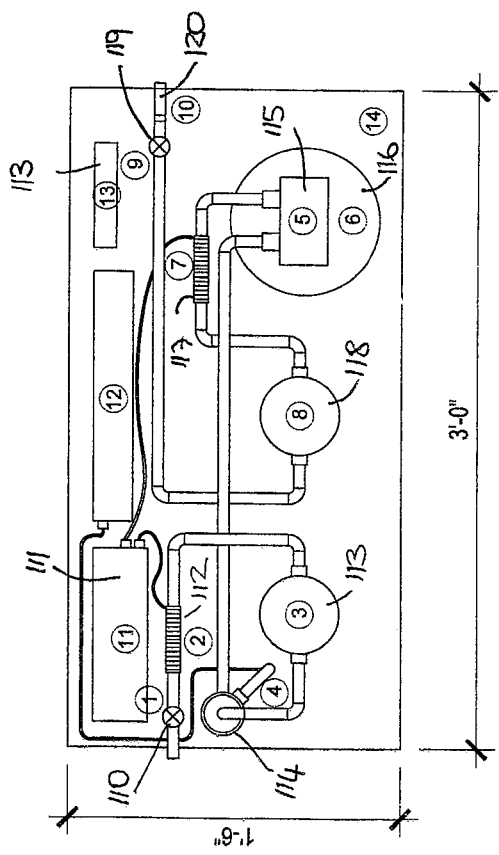
FIG. 9 is a plan or top view of a further embodiment of a water purification and replication system of the invention, also including induction coils.

FIGS. 9 and 10 show a plan view and elevational view of a further embodiment of the invention, which also uses first and second induction coils action on by a frequency resonator 111. In these figures, an inlet valve 110 may be provided, which may have a three-quarter inch diameter, and the water is thereafter moved through the first induction coil 112. The water is directed through the sediment or resin filter 113, which may be citrified as described in further detail above, and thereafter through the ozone injector 114. A programmable controller 115 is provided for controlling the treatment of the water within the resin tank 116. After exiting the resin tank 116, the water passes through a second induction coil 117, also acted upon by the frequency resonator 111. The water then passes through the activated carbon filter 118 through a discharge valve 119 and out of the system through an outlet manifold 120.

Note the presence in these figures of the ozonator 112 which is connected to the ozone injector 114, as described above.

The system may also comprise a surge protected outlet 113, and may be contained within a box container 114. The box container 114 may of course be of different dimensions in different contexts and situations, but a preferred dimension is 36×24×18.

In the embodiment shown in FIGS. 8 to 10 of the drawings, there is an emphasis on the inclusion and placement of the two induction coils. The first induction coil has as its objective the precipitation of the dissolved solids at a known velocity of about 6 to 9 feet per second before entering the sediment filter. The sediment filter collects the precipitated solids. The second induction coil is preferably located on the discharge side of the resin tank because the velocity entering the resin tank slows down, and dissolved solids are reformed with their original polarity at this point. Therefore, the second induction coil will restructure and reverse the polarity of dissolved solids to maintain its dissolution state so as not to bind to any surface at the point of discharge up to the point of use. It is considered that the frequency resonated throughout the body of water along the pipeline distribution will dissolve existing scales (such as calcium and magnesium carbonates), and including rust and control corrosion.

The invention provides a process for and formulation of regeneration resin (cationic and anionic) which is a mixed bed resin organic polymer that can act as a medium for ion exchange. It is an insoluble matrix, providing a large surface area for trapping dissolved solids and minerals with the accompanying release and exchange of ions.

The basic purpose of resin regeneration is to restore the exhausted or partly exhausted resin back to its proper ionic form of service, releasing adsorbed sediments and dissolved solids, simultaneously exchanging ions, and cross linking by copolymerization of styrene (polystyrene sulfonate).

In the case of the present invention, the valve at the inlet of the resin tank is controlled by the rated flow or total volume in the tank. The time on each position of the valve controller is calculated by the formulation as set forth below in one embodiment of the invention, or as may be recommended by the supplier of the mixed bed resin:

(1) Regeneration Time: The regeneration cycle needs about two hours. According to the user's need, it is advantageous to set up the regeneration during the time when the user does not use water. (Only to volume delayed time.)

(2) Water Treatment Capacity: $Q = VR \times E/(YD \times k)$

In the above formula,

VR is: Volume of Resin (m3)

E is: Resin Working Exchanged Capability (mol/m3)

YD is: Rigidity of Inlet Water (mol/m3)

K is: Security Modulus, usually 1.2~2. It is related to the rigidity of inlet water. The k's choosing number increases with rise of modulus.

(3) Backwash Time: This may be related to the consistency of the inlet water. In one embodiment, it is suggested to be set-up at 10~15 minutes. When the consistency is higher, then the backwash time is longer. When the consistency of inlet water is more than 5, a filter may preferably be installed before the control valve.

(4) Brine and Slow Rinse=Brine Draw Time+Slow Rinse Time (Slow Rinse Times also called Replacement Time)

Brine Draw Time: $t = 60 \, VZ/(S \times v)$ (min)

$VZ = mCZ/(C \times p \times 10^3)$ (m3)

In the above formula:

VZ is: Volume of Regenerated Liquid, m3

S is: Cut Area of Exchange Menstruum Layer (exchange equipment) m v is: Flow Velocity of Regenerated Liquid, m/h mCZ is: Regeneration Menstruum Dosage which is with 100% pure and regenerate per Kg.

C is: Consistency of Regenerated Liquid, % p is: Consistency of Regenerated Liquid, %

$mCZ = VREkM/(\varepsilon \times 1000)$ Kg

In the above formula:

VR is: Resin Volume, m3

E is: Volume of Exchange Menstruum, (mol/m3)

K is: Regeneration Menstruum Consumption. For downflow regeneration, k could be chosen as 2~3.5; for upflow regeneration, k could be chosen as 1.2~1.8.

M is: Mol Quality of Regeneration Menstruum, NaCl is 58.5.

$\varepsilon$ is: Consistency of Regenerated Menstruum, in common salt, the NaCl represents 95%~98%.

Slow Rinse Time=Slow Rinse Flow/Slow Rinse velocity (minute).

Water volume of slow wash, in general, is 0.5~1 times that of resin volume.

(5) Brine Refill Time=Brine Refill Water volume/Pouring Water Speed (minute)

Water volume refilled to the tank may be equal to the totally consumed volume of regenerated brine. Because of the differences in inlet water pressure, the velocity of pouring to tank is also different. It is suggested that the actual time of pouring water to tank is 1~2 minutes longer than the time which is calculated in theory as to make sure there is enough water in tank. (Notice: there is a liquid level controller in the tank).

(6) Fast Rinse Time=Fast Rinse Water Volume/Fast Rinse velocity (minute)

Water volume is about 3~6 times that of resin volume. In general, a suggested time of 10~12 minutes may be appropriate, but subject to the discharge water reaching the requirement.

(7) Setting up the interval of backwash and rinsing time could be established using the above formulation for the effective use of the regenerative resin and the equipment. In general, when water is turbid, from #6-#10 level (level from 1-10, 1 being clear and 10 being turbid), BRG (the backwash/rinse/regeneration) time could be set more than the standard and when it is less turbid, #5 down to #2, where BRG time could be set less than the standard.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, a plurality means two or more. As used herein, a set of items may include one or more of such items. As used herein, whether in the written description or the claims, the terms comprising, including, carrying, having, containing, involving, and the like are to be understood to be open-ended, i.e., to mean including but not limited to. Only the transitional phrases consisting of and consisting essentially of, respectively, are closed or semi-closed transitional phrases with respect to claims. Use of ordinal terms such as first, second, third, etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, and/or means that the listed items are alternatives, but the alternatives also include any combination of the listed items.

The invention claimed is:

1. A water replicating system comprising:
  a first water analyzer for analyzing a target first water to determine target relative content of selected components in the target first water;

a water treatment apparatus for receiving and processing a source second water which is separate and different from the target first water;

the water treatment apparatus comprising a second water analyzer for determining source relative content of selected components which are present in the source second water, and absence of one or more of the selected components in the source second water;

the water treatment apparatus further comprising a first treatment portion in which the source relative content of the selected components present in the source second water are increased or decreased to replicate the target relative content of the selected components in the target first water, and a second treatment portion for adding to the source second water the one or more of the selected components which are absent from the source second water to thereby be present in an amount corresponding to that of the target relative content so that the source second water will replicate the target first water.

2. A water replicating system as claimed in claim 1 wherein the second water analyzer further comprises a gas chromatographic analyzer for producing a reading including presence of the source relative content of the selected components in the source second water to be increased or decreased.

3. A water replicating system as claimed in claim 1 wherein the first treatment portion of the water treatment apparatus comprises a frequency resonator for precipitating ingredients contained in the source second water.

4. A water replicating system as claimed in claim 3 wherein the ingredients precipitated comprise calcium and magnesium carbonates.

5. A water replicating system as claimed in claim 1 wherein the first treatment portion of the water treatment apparatus comprises a sediment filter.

6. A water replicating system as claimed in claim 5 wherein the sediment filter comprises stratified citric acid from peelings of oranges and lemons, wherein the sediment filter facilitates precipitation of some ingredients of the source second water.

7. A water replicating system as claimed in claim 6 wherein rust, iron, silica, soil and organic material are precipitated in the sediment filter.

8. A water replicating system as claimed in claim 1 wherein the first treatment portion of the water treatment apparatus comprises an activated carbon filter for removing characteristics selected from the following: odor, color, turbidity, chemicals and pathogens, and bacteria.

9. A water replicating system as claimed in claim 1 further comprising an ionizer for ionizing the source second water.

10. A water replicating system as claimed in claim 1 further comprising an ozonator for injecting ozone into the source second water.

11. A water replicating system as claimed in claim 1 further comprising a Venturi vacuum for injecting ozone into the source second water.

12. A water replicating system as claimed in claim 1 wherein the water treatment apparatus comprises a regenerative formulated resin through which the source second water flows.

13. A water replicating system as claimed in claim 12 wherein the regenerative formulated resin comprises a distribution of anion resins and cation resins contained within a tank.

14. A water replicating system as claimed in claim 13 further comprising a discharge from the tank comprising the regenerative formulated resin for the source second water which has been treated to replicate the target first water.

15. A water replicating system as claimed in claim 13 further comprising an additive water module downstream of the regenerative formulated resin tank for adding properties and characteristics to the source second water which has been treated to replicate the target first water.

16. A water replicating system as claimed in claim 15 wherein the additive water module adds flavoring to the source second water.

17. A water replicating system as claimed in claim 12 further comprising a backwash system for maintaining and regenerating the regenerative formulated resin.

18. A water replicating system as claimed in claim 1 further comprising a first induction coil for facilitating precipitation of dissolved solids at a known velocity of about 6 to 9 feet per second before entering a sediment filter, the precipitated dissolved solids being collected by the sediment filter.

19. A water replicating system as claimed in claim 18 further comprising a second induction coil located on a discharge side of a regenerative formulated resin, the second induction coil restructuring and reversing a polarity of the precipitated dissolved solids to maintain a dissolution state.

20. A method for replicating water comprising:
providing a first water analyzer for analyzing a target first water and determining target relative content of selected components in the target first water;
providing a water treatment apparatus for receiving and processing a source second water which is separate and different from the target first water,
providing a second analyzer for determining source relative content of selected components which are present in the source second water, and absence of one or more of the selected components in the source second water;
utilizing a first treatment portion in which the source relative content of the selected components present in the source second water are increased or decreased to replicate the target relative content of the selected components in the target first water, and
utilizing a second treatment portion for adding to the source second water the one or more of the selected components which are absent from the source second water to thereby be present in an amount corresponding to that of the target relative content so that the source second water will replicate the target first water.

* * * * *